United States Patent [19]
Bridges

[11] 3,799,143
[45] Mar. 26, 1974

[54] FOOD SERVICE SYSTEM

[75] Inventor: John A. Bridges, Nashville, Tenn.

[73] Assignee: Aladdin Industries, Incorporated, Chicago, Ill.

[22] Filed: Nov. 24, 1971

[21] Appl. No.: 201,929

Related U.S. Application Data

[63] Continuation of Ser. No. 869,753, Oct. 27, 1969, abandoned.

[52] U.S. Cl.............. 126/246, 126/261, 206/4, 206/72, 220/23.83
[51] Int. Cl............................................. A47b 31/02
[58] Field of Search .......... 126/246, 261; 220/23.4, 220/23.6, 23.83, 23.86, 16, 17; 206/4, 72; 62/371, 457

[56] References Cited
UNITED STATES PATENTS

| | | | |
|---|---|---|---|
| 3,122,265 | 2/1964 | Innis | 220/97 |
| 2,492,081 | 12/1949 | Williams | 214/1 |
| 3,387,650 | 6/1968 | Hoffmann et al. | 62/371 X |
| 1,786,141 | 12/1930 | Wilson | 220/17 X |
| 924,209 | 6/1909 | Wolfer | 220/23.4 |
| 3,240,610 | 8/1966 | Cease | 220/23.4 X |
| 3,532,247 | 10/1970 | Bridges | 220/23.6 |

*Primary Examiner*—Meyer Perlin
*Assistant Examiner*—Ronald C. Capossela

[57] ABSTRACT

This application discloses a food service system consisting of a plurality of trays formed from an insulating material as by molding. Each tray may have one or more receptacles to receive food holding containers. The bottoms of the receptacles open into coextensive inverted dish portions which may receive the upper portion of a food holding container in a vertically aligned receptacle in the tray beneath. When stacked, the matching receptacles and inverted dish portions form a series of compartments in a vertical column into which foods of like temperature may be put. Upper and lower closures may be provided for insulation at the top and bottom of a stack of trays. Also disclosed is the provision of heated or cooled means at the bottoms of one or more of the vertical columns to help maintain the food at the desired temperature.

2 Claims, 6 Drawing Figures

PATENTED MAR 26 1974 3,799,143
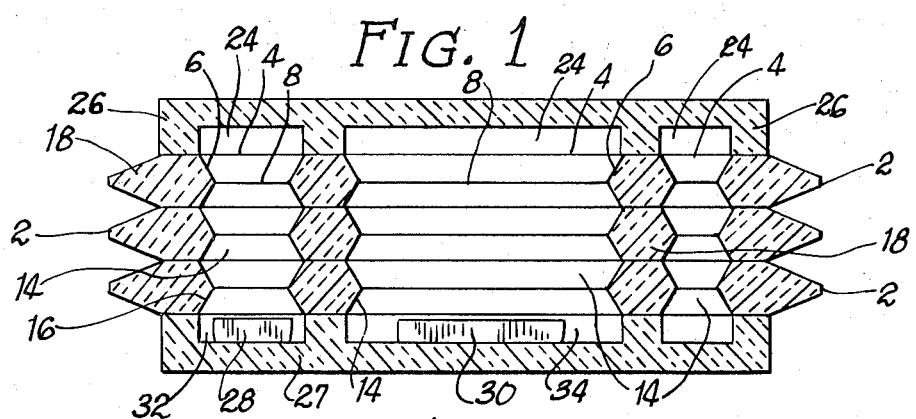
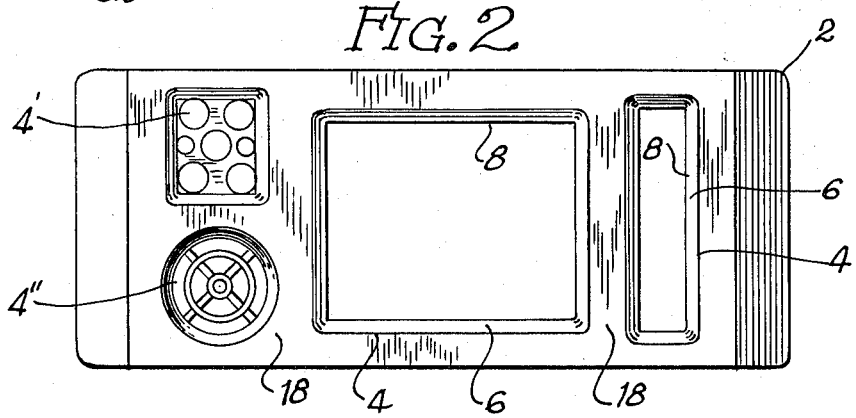
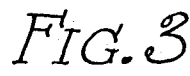
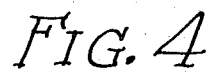
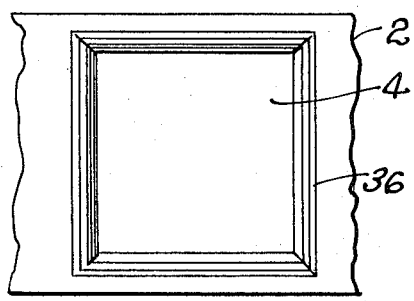
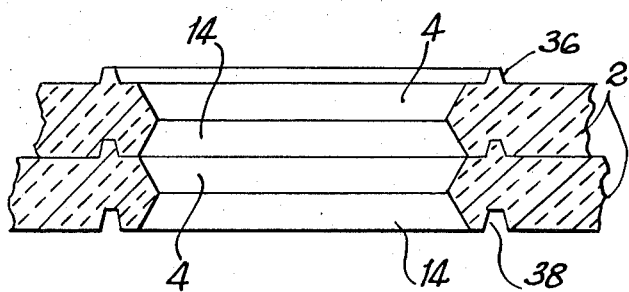
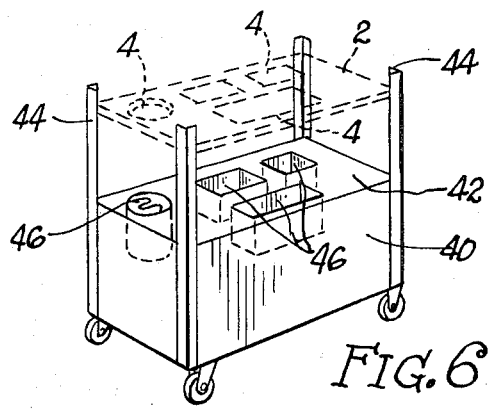
INVENTOR
John A. Bridges
By McDougall Hersh Scott
and Ladd Attys

FOOD SERVICE SYSTEM

This is a continuation of Ser. No. 869,753 filed Oct. 27, 1969 now abandoned.

BACKGROUND OF THE INVENTION

This invention relates to food service apparatus. More specifically, it relates to apparatus useful for serving individuals from common kitchens as on transportation means, in institutions or in any establishment where it is desired to feed a number of people.

Mass feeding of numbers of people has been an ever growing problem as greater numbers use public carriers such as airlines for intercity travel, enter institutions such as hospitals and patronize public feeding establishments of one kind or another. All of these facilities have the continuing need to serve large numbers attractive meals with the various food items at the right temperature, some hot, some cold. Very frequently, as in the case of airlines, the time available for food service is limited and there is a delay between the time of food preparation and its service. In other instances, as in hospitals, there are personnel shortages which cause time delays in food service. In still other cases, as in the case of restaurants of the "carry out" variety, which have a limited selection, food prepared ahead of time is served to large numbers of people in the short periods of the day when people ordinarily eat.

My application Ser. No. 837,979, filed Apr. 28, 1969, now U.S. Pat. No. 3,532,247 for "Insulated Trays For Food And The Like" discloses an insulated food tray having food receiving receptacles and a coextensive dish portion underneath so that when the trays are stacked a food service system is provided which provides a tray for each meal to be served and in which foods of like temperature in each tray are held in vertical columns and insulated from foods in adjacent columns which may be of different temperature.

It is an object of this invention to provide a novel food service system which provides means for maintaining the temperature of individual food portions at their optimum values for long periods of time.

It is another object of this invention to provide a novel food service system which while effectively maintaining individual food portions at their optimum temperature is economical and may be disposed of after use.

SUMMARY OF THE INVENTION

These and other objects are achieved in various embodiments of the invention by a tray molded from insulating material which has one or more receptacles open at their bottoms into which food holding containers may be put. When a number of the trays are stacked with the receptacles aligned vertically, an open vertical column is formed insulated all around the sides whereby foods in a vertical column which are of the same temperature are maintained at that temperature for a relatively long period of time.

BRIEF DESCRIPTION OF THE DRAWING

The invention is defined in the claims forming a part of this specification while the structure and operation of various embodiments may be understood by reference to the detailed description taken in conjunction with the drawing in which:

FIG. 1 is a view in cross section of a food service system embodying the invention;

FIG. 2 is a plan view of a tray in accordance with the invention;

FIG. 3 is a partial plan view of another embodiment of the invention;

FIG. 4 is a partial cross section of the embodiment of FIG. 3;

FIG. 5 is an illustration of one type of food holding container useful with the invention; and FIG. 6 is an illustration of a cart and one tray forming a part of another embodiment of the invention.

DETAILED DESCRIPTION

FIG. 1 of the drawing illustrates a food service system constituting an embodiment of the invention which comprises a plurality of stacked trays 2. Each tray is formed of a heat insulating material by molding such material to any desired shape. In FIG. 1, the shape chosen is rectangular but this is by way of illustration only for it may be round, square or any other shape. Each tray has thickness such to provide a quantity of insulation and mechanical strength for handling.

Each tray is formed with one or more dished receptacles 4 having a side 6 sloping inwardly toward an edge 8 forming a bottom opening. The receptacles are formed to have top openings which may be round, rectangular or any shape to accommodate a food holding container such as a plate, cup or dish. FIG. 5 illustrates a dish 10 which may be molded out of thin plastic material to have a bottom, sides and a lip or flange 12 to permit it to be placed in a dished receptacle 4 with the side 6 of the receptacle conforming to the side of the dish to provide support therefor. The edge 8 may be coextensive with the bottom of the dish 10.

The dish 10 illustrated is merely representative of the type of food holding container that may be used with the tray. Other types may include relatively flat plates, cups, cartons, glasses or cans. It is not necessary that the food holding container terminate flush with the upper surface of the tray for a portion thereof may extend above that surface.

In order to accommodate food holding containers such as cups, glasses, cartons or the like and food portions in dishes which extend above the upper surface of a tray and to provide a compartment 14 for each food portion, an inverted dish portion 16 substantially coextensive with a corresponding dished receptacle 4 is molded in the bottom surface of each tray. The compartments 14 are each open at their tops and bottoms and in a stack of trays form vertical columns of such compartments bounded by the insulating material 18 from which the tray is molded. A stack of trays wherein each tray is formed as described above includes one or more open vertical columns insulated around the sides so there will be a minimum heat loss laterally through the insulation to the exterior of the stack and a minimum heat exchange between adjacent columns but an optimum heat exchange in the vertical direction will be possible. Consequently, when food portions of a first like temperature in individual containers are placed in a vertical column formed in part by a first series of dished receptacles 4 and food portions of a second like temperature are placed in a second vertical column formed in part by a second series of dished receptacles 4, the heat exchanged between the two columns and lost to ambient will be minimal while heat exchange in the vertical direction will be optimal, impeded only by the walls of the food holding container and the food itself. Thus, a hot food such as a service of meat could be placed in containers in one vertical column while a cold food such as ice cream could be placed in containers in an adjacent vertical column and each type of food would be held at its desired serving temperature for a period of time while not tending to heat or cool the other.

A food service system in accordance with the invention could be complete by providing each stack of trays with upper and lower closure members 20 and 22, respectively. The upper closure member is formed by molding a plastic material to have one or more inverted dish portions 24 which are coextensive with the dished receptacles 4 so as to form compartments similar to the compartments 14. It is also provided with downwardly depending side portions 26 to seal the vertical columns formed by the stack of trays from the outside. The lower closure member 22 is formed in a similar manner but in its case the dished portions face upwardly to provide receptacles for the purpose to be described. Thus, a food service system in accordance with the invention is constituted by a plurality of stacked trays which, when stacked, form one or more vertical columns which when food holding containers are placed in the dished receptacle of each tray tend to hold the temperature in the vertical column by providing lateral insulation and top and bottom insulation by means of the upper and lower closure members.

The invention also contemplates that an additional means may be provided for maintaining a desired temperature in a vertical column by utilizing elements capable of being heated or cooled to temperatures other than ambient in each vertical column. Such elements are illustrated symbolically by the means 28 and 30. The element 28 could be a medium having a low coefficient of thermal conductivity capable of being cooled to a temperature lower than ambient and placed in a receptacle 32 formed in the lower closure member 22. The element 30 could be a medium capable of being heated to a temperature higher than ambient and having a high specific heat and placed in a receptacle 34 formed in the lower closure member 22. In this manner, the element 28 could act as a "cold source" for food portions in the column extending above the receptacle 32 while the element 30 could act as a heat source for food portions in the column extending above the receptacle 34. It may be found desirable in the case of "cold sources" to provide the top of the column of compartments holding foods desired to be served cold. Thus, a receptacle could be provided in the upper closure member 20 into which an element such as frozen carbon dioxide could be placed.

FIG. 2 illustrates the top of a tray which embodies the invention. In this FIGURE, the dished receptacles 4 are illustrated as being formed in several different ways. The receptacles 4 on the right hand side of the tray are formed with bottoms opening into their corresponding inverted dish portions 16 with no insulating material in their bottom openings. In the event it is desired to use food holding containers which do not have sufficient mechanical strength on their bottoms to span the opening in a dish receptacle, constructions such as those designated by reference numerals 4' and 4" may be used. The dished receptacle 4' has an open grid molding into its bottom to provide mechanical support for a food holding container placed on its surface or to accommodate a food holding container which is smaller than the dished receptacle and would not be otherwise supported by engaging the sides thereof. The dished receptacle 4" has molded into its bottom a circular support held by radial ribs extending from the sides of the receptacle to accomodate food holding containers in a similar manner. The specific designs of the dished receptacles or their open bottom supports may be varied by a designer in recognition of such factors as economy, ease of molding, desired usage and aesthetic considerations. Alternatively, it may be found desirable to mold trays having solid bottoms in their dished receptacles and to then permit one or more holes in such bottoms to provide the desired openings.

The material selected for molding the tray is an insulating material having a high heat insulating value. Suitable materials are resinous plastic foams such as polyurethane or polystyrene. If desired, the foamed insulating material may be provided with covers which will wthstand heat, cold, moisture and the various acids and other chemical agents which are found in foods. Suitable materials for this purpose are polypropylene, polyethylene, polycarbonate or the like.

While it is possible to achieve effective insulation between the vertical columns by virtue of the contact between the surfaces of the trays, it may be found desirable to provide sealing elements around each dished receptacle 4 and inverted dish portion 14 in order to obtain a greater insulation effect and to prevent slippage between the trays. A form of sealing means illustrated, a tongue and groove construction is used. Thus, the upper surface of a tray 2 is provided with an upstanding ridge or tongue 36 extending around dished receptacle 4 while the bottom of the tray is provided with a cooperating groove 38 into which the tongue of a lower tray may fit in order to provide thermal sealing. Obviously, other configurations may be used or the engagement of the upper surface of a tray with the lower surface of the tray above it may itself provide sufficient sealing.

In another embodiment of the invention which is particularly suitable for food services in institutions such as hospitals, there may be provided a wheeled cart 40 having a flat upper surface 42 on which a stack of trays 2 may be placed for distribution. The cart may be provided with vertical guide members 44 to maintain the stack of trays in position as the cart moves from location to location. The upper surface 42 may be provided with receptacles 46 shaped to conform to the openings in the bottom of the dished receptacles 4. Sources of heat or cooled elements may be placed in the receptacles 46 to assist in maintaining the food portions in the vertical columns formed by the trays stacked on the cart at their desired serving temperatures.

Various modifications may be made in the cart. When such carts are used for food service in institutions such as hospitals, a large percentage of the time between loading food on a tray and service is spent waiting. Therefore, the cart may be provided with electrically powered heating and cooling elements to help maintain the desired temperatures.

Additional modifications and embodiments of the invention will occur to those skilled in the art, and it is intended by the claims appended hereto to cover all those which come within the scope of the invention as set forth and described in this specification.

What is claimed as new and desired to be secured by Letters Patent of the United States is:

1. An insulated food service system comprising a multiplicity of stacking trays made of thermally insulating material, each tray having upper and lower substantially parallel surfaces, and a plurality of apertures formed therein extending from said upper surface to said lower surface for the reception of a food holding dish, each aperture being spaced from every other aperture so that the portions of said tray forming the peripheral walls of each aperture provide for a minimum of heat transfer between food in a dish received in one aperture and food in a dish received in any other aperture, and wherein each aperture in any one tray is coextensive with and correspondingly situated relative to a corresponding aperture in any other tray in a stack of such trays so as to form a plurality of vertical columnar cavities in the stack, each cavity having continuous insulation material on all sides, and wherein the peripheral walls of said aperature taper from said surfaces to a plane of junction intermediate said surfaces, at least one of said aperatures has a support extending thereacross and openings are provided in said support.

2. An insulated food service system comprising a multiplicity of stacking trays made of thermally insulating material, each tray having upper and lower substantially parallel surfaces, and a plurality of apertures formed therein extending from said upper surface to said lower surface tor the reception of a food holding dish, each aperture being spaced from every other aperture so that the portions of said tray forming the peripheral walls of each aperture provide for a minimum of heat transfer between food in a dish received in one aperture and food in a dish received in any other aperture, and wherein each aperture in any one tray is coextensive with and correspondingly situated relative to a corresponding aperture in any other tray in a stack of such trays so as to form a plurality of vertical columnar cavities in the stack, each cavity having continuous insulation material on all sides, and wherein sealing means are provided around each aperture between the lower surface of one tray and the upper tray of the holder beneath it.

\* \* \* \* \*